(12) United States Patent
Pathak (10) Patent No.: US 10,600,596 B2
(45) Date of Patent: Mar. 24, 2020

(54) ADAPTER TO ATTACH IMPLEMENTS TO AN ACTIVELY CONTROLLED HUMAN TREMOR CANCELLATION PLATFORM

(71) Applicant: VERILY LIFE SCIENCES LLC, Mountain View, CA (US)

(72) Inventor: Anupam J. Pathak, Mountain View, CA (US)

(73) Assignee: Verily Life Sciences LLC, South San Francisco, CA (US)

(*) Notice: Subject to any disclaimer, the term of this patent is extended or adjusted under 35 U.S.C. 154(b) by 1022 days.

(21) Appl. No.: 14/681,549

(22) Filed: Apr. 8, 2015

(65) Prior Publication Data

US 2015/0300394 A1    Oct. 22, 2015

Related U.S. Application Data

(60) Provisional application No. 61/982,240, filed on Apr. 21, 2014.

(51) Int. Cl.
*F16B 21/10* (2006.01)
*H01H 36/00* (2006.01)
(Continued)

(52) U.S. Cl.
CPC ......... *H01H 36/0013* (2013.01); *A47G 21/02* (2013.01); *F16B 21/065* (2013.01);
(Continued)

(58) Field of Classification Search
CPC ...... F16B 21/10; F16B 3/00; A47G 2200/046; A47G 21/02
See application file for complete search history.

(56) References Cited

U.S. PATENT DOCUMENTS 3,204,634 A * 9/1965 Koehn ............... A61B 17/3415
                                                       604/164.01
3,711,638 A    1/1973 Davies
(Continued)

FOREIGN PATENT DOCUMENTS

AT         411 011 B        9/2003
CN       203646979 U        6/2014
(Continued)

OTHER PUBLICATIONS

Pathak, A. et al., "A Noninvasive Handheld Assistive Device to Accommodate Essential Tremor: A Pilot Study," Brief Report, Movement Disorders, May 2014; 29(6):838-42. doi: 10.1002/mds.25796.

(Continued)

*Primary Examiner* — Devin B Henson
*Assistant Examiner* — Huong Q Nguyen
(74) *Attorney, Agent, or Firm* — Christensen O'Connor Johnson Kindness PLLC (57) ABSTRACT

Embodiments are disclosed of an adapter for coupling an implement to a tremor cancellation platform. The adapter includes a first section attached to the tremor cancellation platform, the first section comprising an elongated tapered key having a base and a tip, the base having a greater transverse dimension than the tip and the base being attached to the tremor cancellation platform. The adapter also includes a second section coupled to the implement, the second section including a tapered cavity sized and shaped to receive the first section, and a latch to lock the second section onto the first section.

18 Claims, 5 Drawing Sheets

(51) Int. Cl.
  *F16B 21/06* (2006.01)
  *A47G 21/02* (2006.01)
  *F16B 3/00* (2006.01)
  *F16B 3/06* (2006.01)

(52) U.S. Cl.
  CPC .......... *A47G 2200/046* (2013.01); *F16B 3/00* (2013.01); *F16B 3/06* (2013.01)

(56) References Cited

U.S. PATENT DOCUMENTS

| | | | |
|---|---|---|---|
| 4,479,797 A | 10/1984 | Kobayashi et al. | |
| 4,766,708 A | 8/1988 | Sing | |
| 5,148,715 A | 9/1992 | Blaser et al. | |
| 5,316,479 A | 5/1994 | Wong et al. | |
| 5,562,707 A | 10/1996 | Prochazka et al. | |
| 5,691,898 A | 11/1997 | Rosenberg et al. | |
| 5,934,250 A | 8/1999 | Fujikawa et al. | |
| 6,234,045 B1 | 5/2001 | Kaiser | |
| 6,238,384 B1 | 5/2001 | Peer | |
| 6,328,747 B1* | 12/2001 | Nun .................. | A61B 17/16 604/22 |
| 6,458,089 B1 | 10/2002 | Ziv-Av | |
| 6,547,782 B1 | 4/2003 | Taylor | |
| 6,695,794 B2 | 2/2004 | Kaiser et al. | |
| 6,697,048 B2 | 2/2004 | Rosenberg et al. | |
| 6,697,748 B1 | 2/2004 | Rosenberg et al. | |
| 6,704,001 B1 | 3/2004 | Schena et al. | |
| 6,704,002 B1 | 3/2004 | Martin et al. | |
| 6,730,049 B2 | 5/2004 | Kalvert | |
| 6,740,123 B2 | 5/2004 | Davalli et al. | |
| 6,743,187 B2 | 6/2004 | Solomon et al. | |
| 6,946,812 B1 | 9/2005 | Martin et al. | |
| 7,106,313 B2 | 9/2006 | Schena et al. | |
| 7,224,642 B1 | 5/2007 | Tran et al. | |
| 7,725,175 B2 | 5/2010 | Koeneman et al. | |
| 7,883,479 B1 | 2/2011 | Stanley et al. | |
| 8,286,723 B2 | 10/2012 | Puzio et al. | |
| 8,308,664 B2 | 11/2012 | Pathak et al. | |
| 9,074,847 B1 | 7/2015 | Sullivan et al. | |
| 2001/0012932 A1 | 8/2001 | Peer | |
| 2002/0120180 A1* | 8/2002 | Speier ................ | A61B 1/00135 600/125 |
| 2003/0006357 A1 | 1/2003 | Kaiser et al. | |
| 2003/0036805 A1 | 2/2003 | Senior | |
| 2003/0209678 A1 | 11/2003 | Pease | |
| 2003/0233101 A1* | 12/2003 | Lubock ............. | A61M 37/0069 606/116 |
| 2005/0113652 A1 | 5/2005 | Stark et al. | |
| 2005/0197623 A1* | 9/2005 | Leeflang .......... | A61M 25/0144 604/95.04 |
| 2006/0044942 A1 | 3/2006 | Brinn et al. | |
| 2006/0241510 A1 | 10/2006 | Halperin et al. | |
| 2007/0050139 A1 | 3/2007 | Sidman | |
| 2007/0109783 A1 | 5/2007 | Wilson et al. | |
| 2007/0270784 A1 | 11/2007 | Smith et al. | |
| 2008/0319345 A1* | 12/2008 | Swenson ............ | A61B 5/15003 600/576 |
| 2009/0031839 A1 | 2/2009 | Shimizu et al. | |
| 2009/0173351 A1 | 7/2009 | Sahin et al. | |
| 2009/0203972 A1 | 8/2009 | Heneghan et al. | |
| 2009/0227925 A1 | 9/2009 | McBean et al. | |
| 2009/0254003 A1 | 10/2009 | Buckman | |
| 2009/0276058 A1 | 11/2009 | Ueda et al. | |
| 2010/0013860 A1 | 1/2010 | Mandella et al. | |
| 2010/0036384 A1 | 2/2010 | Gorek et al. | |
| 2010/0079101 A1 | 4/2010 | Sidman | |
| 2010/0130873 A1 | 5/2010 | Yuen et al. | |
| 2010/0198362 A1 | 8/2010 | Puchhammer | |
| 2010/0274365 A1 | 10/2010 | Evans et al. | |
| 2011/0112442 A1 | 5/2011 | Meger et al. | |
| 2012/0139456 A1 | 6/2012 | Takano et al. | |
| 2012/0249310 A1 | 10/2012 | Hotaling | |
| 2013/0060124 A1 | 3/2013 | Zietsma | |
| 2013/0060278 A1 | 3/2013 | Bozung et al. | |
| 2013/0118320 A1 | 5/2013 | Richardson | |
| 2013/0123666 A1 | 5/2013 | Giuffrida et al. | |
| 2013/0123684 A1 | 5/2013 | Giuffrida et al. | |
| 2013/0123759 A1 | 5/2013 | Kang et al. | |
| 2013/0297022 A1 | 11/2013 | Pathak | |
| 2014/0052275 A1 | 2/2014 | Pathak | |
| 2014/0171834 A1 | 6/2014 | DeGoede et al. | |
| 2014/0257047 A1 | 9/2014 | Sillay et al. | |
| 2014/0257141 A1 | 9/2014 | Giuffrida et al. | |
| 2014/0303605 A1 | 10/2014 | Boyden et al. | |
| 2014/0303660 A1 | 10/2014 | Boyden et al. | |

FOREIGN PATENT DOCUMENTS

| | | |
|---|---|---|
| JP | 2008/067936 A | 3/2008 |
| JP | 2010-118798 A | 5/2010 |
| WO | WO 00/78263 A2 | 12/2000 |
| WO | WO 2008/123200 | 10/2008 |
| WO | WO 2013/049020 A1 | 4/2013 |
| WO | WO 2014/113813 A1 | 7/2014 |
| WO | WO 2015/003133 A1 | 1/2015 |

OTHER PUBLICATIONS

PCT/US2014/045409—International Search Report and Written Opinion of the International Searching Authority, dated Nov. 3, 2014, 9 pages.
AU 2012316278—Australian Examination Report, dated Jul. 24, 2014, 3 pages.
Sharon Smaga, "Tremor", American Family Physician, vol. 68, No. 8, Oct. 15, 2003, p. 1545-1552.
Louis, E.D., et al., "How common is the most common adult movement disorder estimates of the prevalence of essential tremor throughout the world", Movement Disorders, 1998, 13(1): p. 5-10.
Louis, E.D., et al., "Correlates of Functional Disability in Essential Tremor", Movement Disorders, 2001, 16(5): p. 914-920.
Diamond, A., et al., "The effect of deep brain stimulation on quality of life in movement disorders", Journal of Neurology, Neurosurgery & Psychiatry, 2005, 76(9): p. 1188-1193.
Ahmad Anouti, et al., "Tremor Disorders Diagnosis and Management", Western Journal of Medicine, 1995, 162(6): p. 510-513.
National Parkinson Foundation, Treatment options, 2009, http://www.parkinson.org/Parkinson-s-Disease/Treatment.
E. Rocon, et al., "Theoretical Control Discussion on Tremor Suppression via Biomechanical Loading", 2003.
Caroline GL Gao, et al., "Robotics in Healthcare: HF Issues in Surgery," 2007, Online paper, http://ase.tufls.edu/mechanicai/EREL/Publications/D-4.pdf, 33 pages.
Rubia P Meshack, et al., "A randomized controlled trial of the effects of weights on amplitude and frequency of postural hand tremor in people with Parkinson's disease", Clinical Rehabilitation, 2002, 16(5): p. 481-492.
Mario Manto, et al., "Dynamically Responsive Intervention for Tremor Suppression", IEEE Engineering in Medicine and Biology Magazine, 2003, 22(3): p. 120-132.
Eduardo Rocon, et al., "Mechanical suppression of essential tremor", The Cerebellum, 2007, 6(1): p. 73-78.
E. Rocon, et al., "Rehabilitation Robotics: a Wearable Exo-Skeleton for Tremor Assessment and Suppression", Proceedings of the 2005 IEEE International Conference on Robotics and Automation, 2005, p. 2271-2276.
Mark Heath, et al., "Design Considerations in Active Orthoses for Tremor Suppression: Ergonomic Aspects and Integration of Enabling Technologies", Assistive Technology—Shaping the Future AAATE, 2003, p. 842-846.
Olivier W. Bertacchini, et al., "Fatigue life characterization of shape memory alloys undergoing thermomechanical cyclic loading", Smart Structures and Materials 2003, 2003. 5053: p. 612-624.
DC-Micromotors, Application Datasheet, 0615 4.5S. 2010; available from: http://www.micromo.com.
Rodger J. Elble, "Physiologic and essential tremor", Neurology, 1986, 36(2): p. 225-231.

(56) References Cited

OTHER PUBLICATIONS

Cameron N. Riviere, et al., "Toward Active Tremor Canceling in Handheld Microsurgical Instruments", IEEE Transactions on Robotics and Automation, vol. 19, No. 5, Oct. 2003, p. 793-800.
Mitchell F. Brin, et al., "Epidemiology and Genetics of Essential Tremor", Movement Disorders, 1998. 13(S3): p. 55-63.
Rodger J. Elble, et al., "Essential tremor frequency decreases with lime", Neurology, 2000, 55(10): p. 1547-1551.
Pathak et al. "Dynamic characterization and single-frequency cancellation performance of Smash (SMA actuated stabilizing handgrip)." In: Modeling, Signal Processing, and Control for Smart Structures, Proceedings of SPIE, vol. 6926, 2008, pp. 692602-1 through 692602-12 [online]. Retrieved on Nov. 26, 2012 (Nov. 26, 2012). Retrieved from the Internet at URL:<http://144.206.159.178/ft/CONF/16413457/16413459.pdf>, entire document.
Shaw et al. "A reduced-order thermomechanical model and analytical solution for uniaxial shape memory alloy wire actuators." In: Smart Materials and Structures, vol. 18, 2009, pp. 1-21 [online]. Retrieved on Nov. 26, 2012 (Nov. 26, 2012). Retrieved from the Internet at URL:<hltp://deepblue.lib.umich.edu/bitstream/2027.42/65088/2/sms9_6_065001.pdf>, entire document, especially Fig. 1b; p. 3, col. 1.
PCT/US2012/057048—International Search Report and Written Opinion of the International Searching Authority, dated Dec. 17, 2012.
Great Lakes Neurotechnologies, Press Release "Great Lakes Neurotechnologies Awarded Patent for Sensor Based Continuous Parkinsons Assessment During Daily Activities", Dec. 3, 2013, 2 pages www.glneurotech.com.
Pedley, Mark, "Tilt Sensing Using a Three-Axis Accelerometer", Freescale Semiconductor, Inc. Application Note, Document No. AN3461, Rev. 6, Mar. 2013, 22 pages.
Wireless & Mobile Human Monitoring, Latency Tech Note—Wireless Physiological Monitoring, Motion Sensor Latencies for Software Development, 4 pages retrieved from internet Feb. 3, 2015, http://glneurotech.com/bioradio/latency-tech-note/.
Wireless & Mobile Human Monitoring, Wireless motion sensor for 3D data acquisition via Bluetooth technology, Wireless Motion Sensor, 3 pages retrieved from internet Feb. 3, 2015, http://glneurotech.com/bioradio/physiological-signal-monitoring/wireless-motion-sensor/.
PCT/US2012/057048, PCT International Preliminary Report on Patentability, dated Apr. 1, 2014, 5 pages.
Pathak, A. et al., "Measurement and Collection of Human Tremors Through a Handheld Tool" U.S. Appl. No. 14/627,893, filed Feb. 20, 2015, whole document.
Pathak, A. et al., "Handheld Tool for Leveling Uncoordinated Motion" U.S. Appl. No. 14/668,516, filed Mar. 25, 2015, whole document.
U.S. Appl. No. 13/250,000—Restriction Requirement, dated Dec. 19, 2012, 9 pages.
U.S. Appl. No. 13/250,000—Non-Final Office Action, dated Apr. 5, 2013, 11 pages.
U.S. Appl. No. 13/250,000—Final Office Action, dated Mar. 20, 2014, 11 pages.
JP 2014-533640—First Japanese Office Action, dated Mar. 31, 2015, 5 pages.
U.S. Appl. No. 13/250,000—Non-Final Office Action, dated Apr. 2, 2015, 19 pages.
U.S. Appl. No. 13/935,387—Non-Final Office Action, dated Apr. 3, 2015, 25 pages.
CN 2012-80047035.X—First Chinese Office Action, with English Translation, dated Apr. 28, 2015, 10 pages.
PCT/US2015/025781—International Search Report and Written Opinion of the International Searching Authority, dated Jul. 1, 2015.
EP 12834632.7—European Search Report, dated Jun. 10, 2015, 5 pages.
Louis, E.D., "Essential Tremor", Handbook of Clinical Neurology, vol. 100, 2011, pp. 433-448.
Deuschl, G. et al., "Treatment of Patients with Essential Tremor", Lancet Neural of 2011, 10: 148-161.
Umemura, A. et al., "Deep Brain Stimulation for Movement Disorders: Morbidity and Mortality in 109 Patients", J Neurosurg 98: 779-784, 2003.
CN 201280047035X—Third Office Action with English translation, dated Feb. 26, 2016, 8 pages.
PCT/US2016/013704—International Search Report and Written Opinion, dated Apr. 6, 2016, 19 pages.
Kostikis, N. et al.—"Smartphone-based evaluation of parkinsonian hand tremor: Quantitative measurements vs clinical assessment scores", 2014 36th Annual International Conference of the IEEE Engineering in Medicine and Biology Society, IEEE, Aug. 26, 2014, pp. 906-909.
AU 2012316278—Australian Notice of Acceptance, dated Jan. 15, 2015, 2 pages.
AU 2012316278—Australian Notice of Grant, dated May 14, 2015, 2 pages.
KR 10-2014-7011131—First Office Action, with English translation, dated Aug. 20, 2015, 7 pages.
CN 2012-80047035.X—Second Chinese Office Action, with English Translation, dated Sep. 14, 2015, 11 pages.
JP 2014-533640—Notice of Allowance, dated Dec. 2, 2014, 3 pages.
PCT/US2014/045409, PCT International Preliminary Report on Patentability, dated Jan. 14, 2016, 8 pages.
JP 2016-000701—Office Action with English Translation, dated Jan. 10, 2017, 15 pages.
U.S. Appl. No. 13/935,387—Non-Final Office Action, dated Apr. 6, 2017, 14 pages.
U.S. Appl. No. 13/250,000—Non-Final Office Action, dated Apr. 6, 2016, 13 pages.
U.S. Appl. No. 13/935,387—Non-Final Office Action, dated Apr. 11, 2016, 13 pages.
U.S. Appl. No. 13/250,000—Notice of Allowance, dated Oct. 1, 2015, 5 pages.
U.S. Appl. No. 13/250,000—Non-Final Office Action, dated Oct. 19, 2016, 9 pages.
U.S. Appl. No. 13/935,387—Notice of Allowance, dated Oct. 7, 2015, 6 pages.
U.S. Appl. No. 13/935,387—Final Office Action, dated Oct. 21, 2016, 10 pages.
PCT/US2015/025781—International Preliminary Report on Patentability, dated Nov. 3, 2016.
EP 12834632.7—Examination Report, dated Oct. 18, 2016, 5 pages.

* cited by examiner

SECTION I-I

ADAPTER TO ATTACH IMPLEMENTS TO AN ACTIVELY CONTROLLED HUMAN TREMOR CANCELLATION PLATFORM

CROSS-REFERENCE TO RELATED APPLICATIONS

This application claims priority under 35 U.S.C. § 119(e) to U.S. Provisional Application No. 61/982,240, filed 21 Apr. 2014.

TECHNICAL FIELD

The disclosed embodiments relate to a tremor cancellation platform and more particularly, but not exclusively, to a tremor cancellation platform including an adapter for attaching different implements to the tremor cancellation platform.

BACKGROUND

A significant percentage of the world's population suffers from neurological motion disorders. In the United States alone, up to ten million people suffer from Essential Tremor and 1 million suffer from Parkinson's disease. In many of these motion disorders, upper limb tremors can interfere with patients' daily activities such as eating, writing, etc. Medications are variably effective and often come with side effects. Surgical treatments are effective, but they can be costly and are typically reserved for much more severe cases. Improved therapies, therefore, are currently needed.

A handheld tremor cancellation platform has been developed that is noninvasive and actively cancels the transmission of an individual's tremor to an implement being held. The tremor cancellation platform senses the tremor direction and moves the held object in an opposite direction to stabilize it. Because the device compensates for the tremor but does not act to suppress the tremor, it can use much smaller actuators, enabling an extremely lightweight and compact form factor.

Practical attachment of implements improves operation and use of the tremor cancellation platform. Attachment of implements to the tremor cancellation platform must be intuitive, especially for someone with hand tremor, and it must facilitate the overall water-proofing of the device. The implement must also be securely held once attached to the tremor cancellation platform. Traditional attachment techniques have drawbacks that do not satisfy the aforementioned requirements.

BRIEF DESCRIPTION OF THE DRAWINGS

Non-limiting and non-exhaustive embodiments of the invention are described with reference to the following figures, in which like reference numerals refer to like parts throughout the various views unless otherwise specified.

DETAILED DESCRIPTION OF THE ILLUSTRATED EMBODIMENTS

Embodiments are described of an apparatus, system and method for an adapter for attaching different implements to a tremor cancellation platform. Specific details are described to provide a thorough understanding of the embodiments, but one skilled in the relevant art will recognize that the invention can be practiced without one or more of the described details, or with other methods, components, materials, etc. In some instances, well-known structures, materials, or operations are not shown or described in detail but are nonetheless encompassed within the scope of the invention.

Reference throughout this specification to "one embodiment" or "an embodiment" means that a described feature, structure, or characteristic can be included in at least one described embodiment, so that appearances of "in one embodiment" or "in an embodiment" do not necessarily all refer to the same embodiment. Furthermore, the particular features, structures, or characteristics may be combined in any suitable manner in one or more embodiments.

Figure 1A:
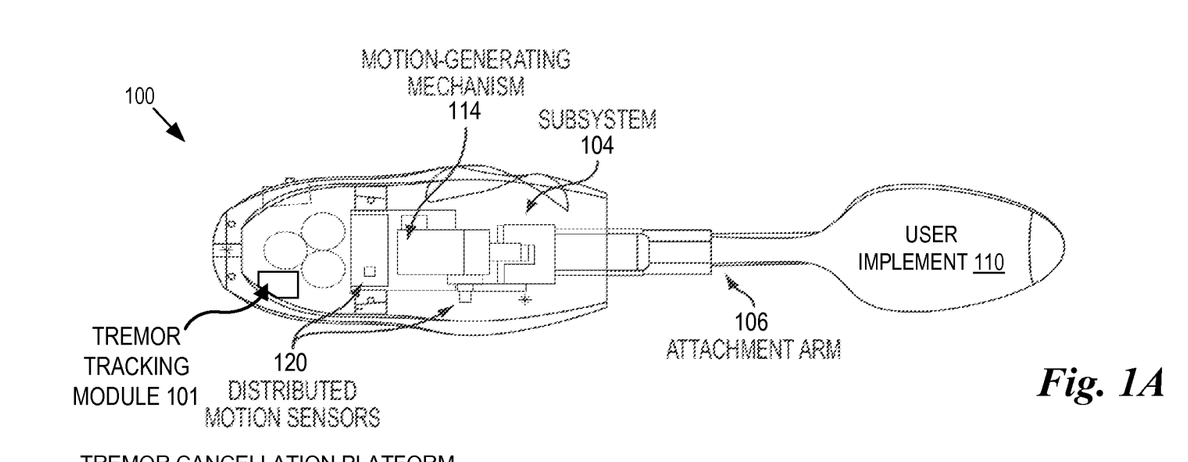
FIG. 1A is a cross-sectional drawing of an embodiment of a tremor cancellation platform.
Figure 1B:
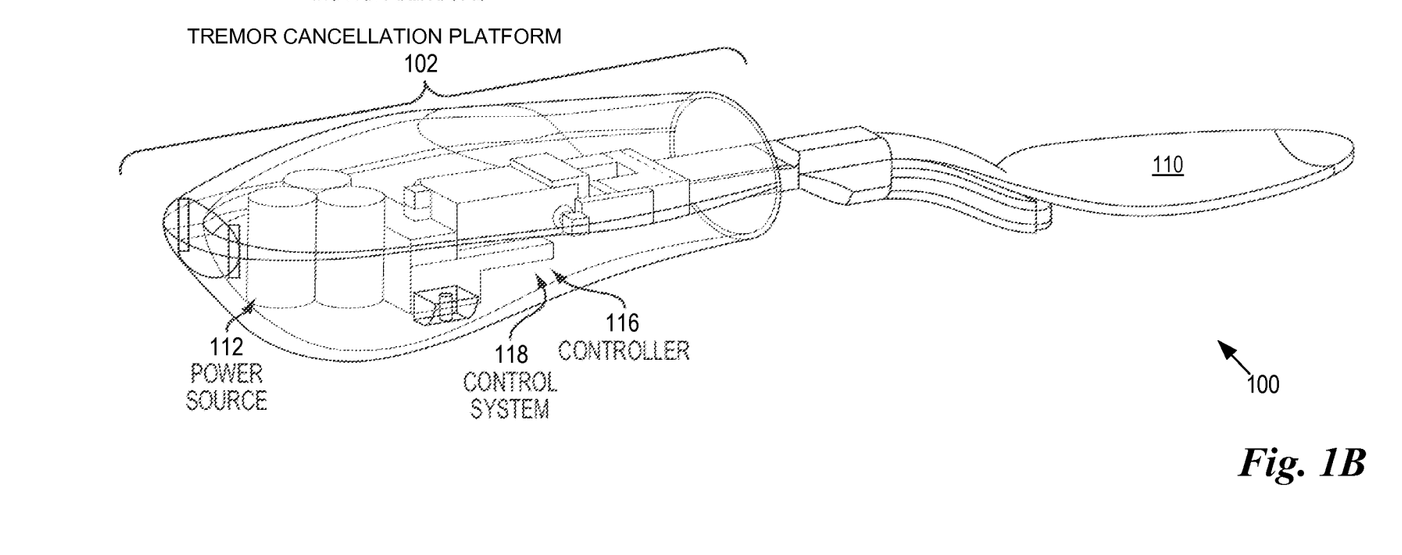
FIG. 1B is a perspective view of an embodiment of a tremor cancellation platform.

FIGS. 1A-1B together illustrate a handheld tool 100 that measures and compensates for unintentional muscle movements. FIG. 1A is a cross-sectional view, FIG. 1B a perspective view. Handheld tool 100 can detect and compensate for unintentional muscle movement (tremors). Accordingly, the illustrated embodiment includes subsystems to detect and compensate for tremors. These subsystems can have distinct components, or share some components such as power systems, memory, a controller, and one or more sensors. In some embodiments, one or more components of the subsystem for detecting and compensating for tremors can be omitted.

Handheld tool 100 includes a tremor cancellation platform 102, which functions as a handle for holding handheld tool 100. Handheld tool 100 also includes an attachment arm 106 coupled to tremor cancellation platform 102. Attachment arm 106 is configured to accept an implement 110 (e.g., a spoon in the illustrated embodiment) on its end, thus coupling the implement to tremor cancellation platform 102.

The illustrated embodiment of tremor cancellation platform 102 includes a subsystem 104 for detecting and compensating for tremors of implement 110. In the illustrated embodiment, subsystem 104 includes distributed motion sensors 120 to measure movement of tremor cancellation platform 102 and implement 110. Subsystem 104 further includes a portable power source 112, a motion-generating mechanism 114, a controller 116, a control system 118, and at least one distributed motion sensor 120 for measuring relative motion of attachment arm 106 relative to housing 102. In other embodiments, one or more of the components of subsystem 104 for compensating tremor motions can be omitted (e.g., inertial sensor 108, motion-generating mechanism 114, etc.) while still implementing the tremor detection and compensation functionality.

In one embodiment, attachment arm 106 is integrated with a specific type of implement 110 (spoon illustrated). In other embodiments, attachment arm 106 can receive a variety of different implements 110 in a variety of ways including but not limited to a friction, snap, or other form of locking mechanism (see, e.g., FIGS. 3A-3C). Portable power source 112 can use a variety of options including a rechargeable battery, a solar panel, etc.

The at least one distributed motion sensor 120 detect unintentional muscle movements and measure signals related to these unintentional muscle movements that are created when a user adversely affects motion of implement 110. These sensors also detect the motion of the stabilized output relative to the housing 102. Control system 118 sends voltage commands in response to the signals to the motion-generating mechanism 114 through the controller 116 to cancel the user's tremors or unintentional muscle movements. This cancellation maintains and stabilizes a position of the implement 110, keeping it centered relative to the housing 102.

Different embodiments of tremor cancellation platform 102 can use various implementations of controller 116, at least one distributed motion sensor 120, and control system 118, and still be within the scope of the present disclosure. In one embodiment, controller 116 comprises an electrical system capable of producing an electrical response from sensor inputs such as a programmable microcontroller a field-programmable gate array (FPGA), an application specific integrated circuit ("ASIC"), or otherwise. In one embodiment, controller 116 comprises an 8-bit ATMEGA8A programmable microcontroller manufactured by Atmel due to its overall low cost, low power consumption and ability to be used in high-volume applications.

In one embodiment, the at least one distributed motion sensor 120 is a contactless position sensor including but not limited to a hall-effect magnetic sensor. In one embodiment, the control system 118 is a closed-loop control system. The closed-loop control system senses motion and acceleration at various points along handheld tool 100 and feeds detailed information into a control algorithm that moves motion-generating mechanism 114 appropriately to cancel the net effect of a user's unintentional muscle movements and thus stabilize the position of implement 110.

Although in the illustrated embodiment implement 110 is a spoon, in other embodiments it can be a different implement such as a manufacturing tool, a surgical tool, a kitchen utensil (e.g., fork, knife, spoon), a sporting tool, a yard tool, a grooming tool (e.g., comb, nail clippers, tweezers, make-up applicator, etc.), a dental hygiene tool (e.g., toothbrush, flossing tool, etc.), or a pen or pencil. Thus, handheld tool 100 can be useful not only for improving the quality of life of individuals suffering from neurological motion disorders, but also for a variety of applications where physiological tremor is an issue, including but not limited to manufacturing, surgical and public safety applications.

In the illustrated embodiment, the at least one distributed motion sensor 120 is located within the tremor cancellation platform 102. The at least one distributed motion sensor 120 measures the relative motion of attachment arm 106 relative to the housing 102, wherein implement 110 is kept at a center position relative to housing 102. In one embodiment, the at least one distributed motion sensor 120 is at least one contactless hall-effect position sensor that provides angular feedback for control system 118 and relies on a changing magnetic field that is dependent on the actuation angle.

The changing magnetic field is detected by a strategically placed integrated circuit (IC) located within the at least one distributed motion sensor 120, whose analog output is read by controller 116, providing a completely non-contact angular detection that is capable of withstanding a large number of cycles. The at least one distributed motion sensor 120, with its contactless sensing methods, provides improved reliability over conventional direct-contact sensing methods such as potentiometers that wear over time.

In one embodiment, handheld tool 100 uses a combination of coreless micro-motors and miniature gear-reduction systems coupled to the coreless micro-motors using a coupling mechanism to implement motion-generating mechanism 114. Significant force of up to 10 Newtons (N) can also be produced with these coreless micro-motors at the required tremor frequency of 0-5 hertz (Hz) through the use of a low-cost miniature gear-reduction system, with a total weight of only 6.5 grams (g). Furthermore, the power drawn from this technology is low, estimated at 0.5 watts (W).

Figure 2A:
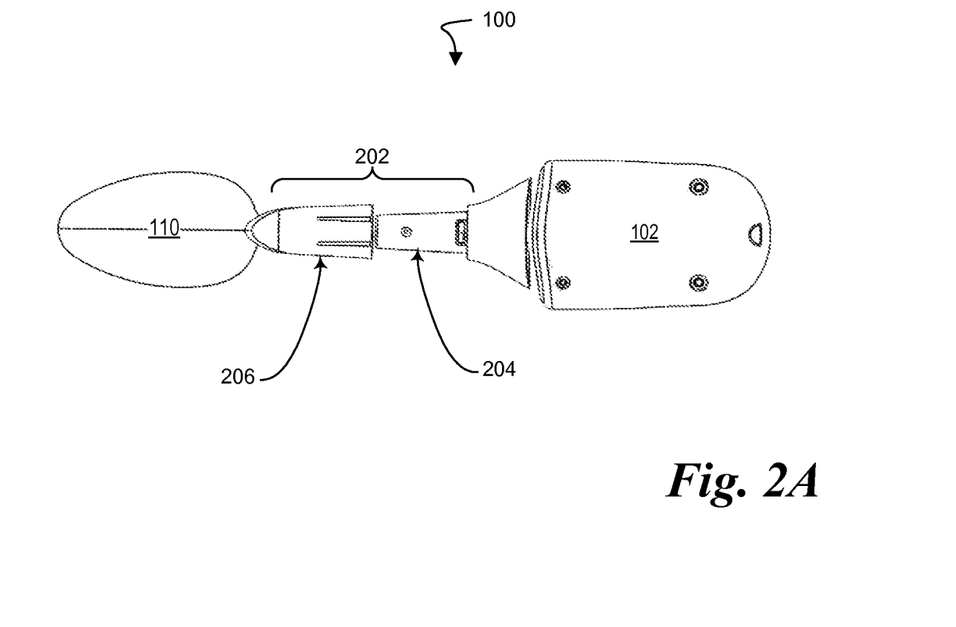
FIGS. 2A-2B are bottom and side views, respectively, of an embodiment of an adapter for attaching a user implement to a tremor cancellation platform.
Figure 2B:
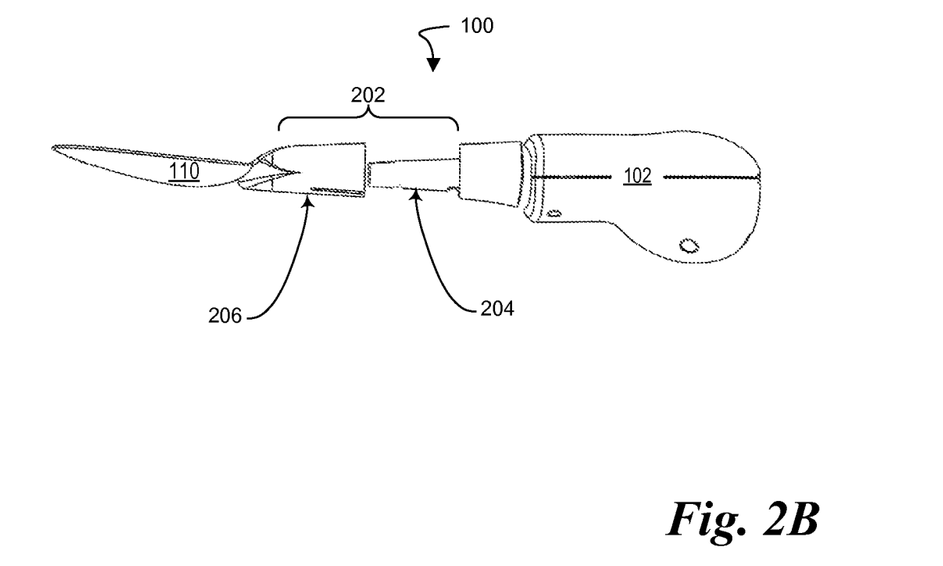

FIGS. 2A-2B illustrate an embodiment of an adapter 202 for attaching an implement 110 to a tremor cancellation platform 102. FIG. 2A is a bottom view, FIG. 2B a side view. Adapter 202 enables connection many different implements 110 to the tremor cancellation platform 102 and ensures correct orientation of implement 110 and ease of insertion when the user is experiencing tremor.

Adapter 202 includes two main parts: a first section first adapter section 204 coupled to tremor cancellation platform 102, and a second adapter section 206 coupled to implement 110. An implement is a tool, utensil, or other piece of equipment used for a particular purpose. In the illustrated embodiment implement 110 is a spoon, but in other embodiments implement 110 can be any of various tools, for instance a manufacturing tool, a surgical tool, a kitchen utensil (e.g., fork, knife, spoon), a sporting tool, a yard tool, a grooming tool (e.g., comb, nail clippers, tweezers, make-up applicator, etc.), a dental hygiene tool (e.g., toothbrush, flossing tool, etc.), or a pen, pencil or paintbrush.

First adapter section 204 is a tapered key designed to fit within second adapter section 206: the tapered key that forms first adapter section 204 drafts to a narrower cross section as it moves away from the tremor cancellation platform. The taper allows clearance between the opening of the second adapter section and the tip of the first adapter section, making it easy to insert for a user with hand tremors. And first adapter section 204 has a keyed shape that rejects second adapter portion 206 if it is not inserted in the correct orientation. Visual cues can also be included as part of the attachment to facilitate correct insertion orientation.

Adapter 102 also provides a way to turn on the tremor cancellation platform's power without the need for a user to interact with a physical button or switch. It includes a contactless power switch that automatically activates the stabilization system when first adapter section 204 is secured within second adapter section 206. This enables intuitive use as well as simplicity, water-proofing, and long-term reliability.

Figure 3A:
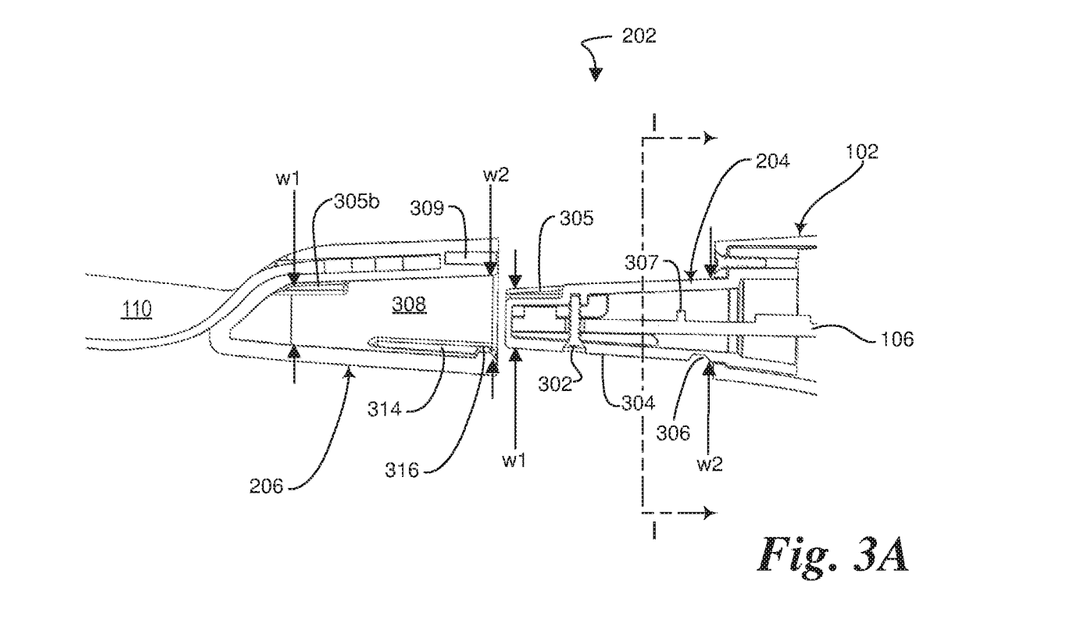
FIG. 3A is a longitudinal cross-sectional view of an embodiment of an adapter for attaching a user implement to a tremor cancellation platform.
Figure 3B:
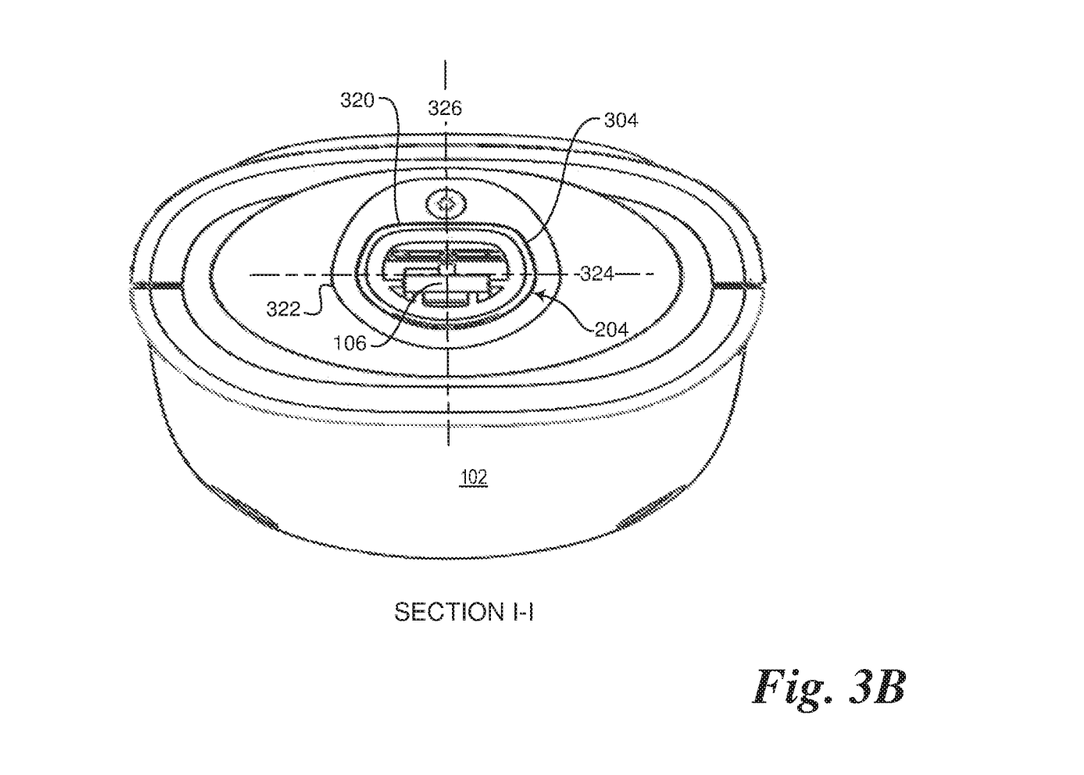
FIG. 3B is a transverse cross-sectional drawing of the embodiment of an adapter shown in FIG. 3A, taken substantially along section line I-I.
Figure 3C:
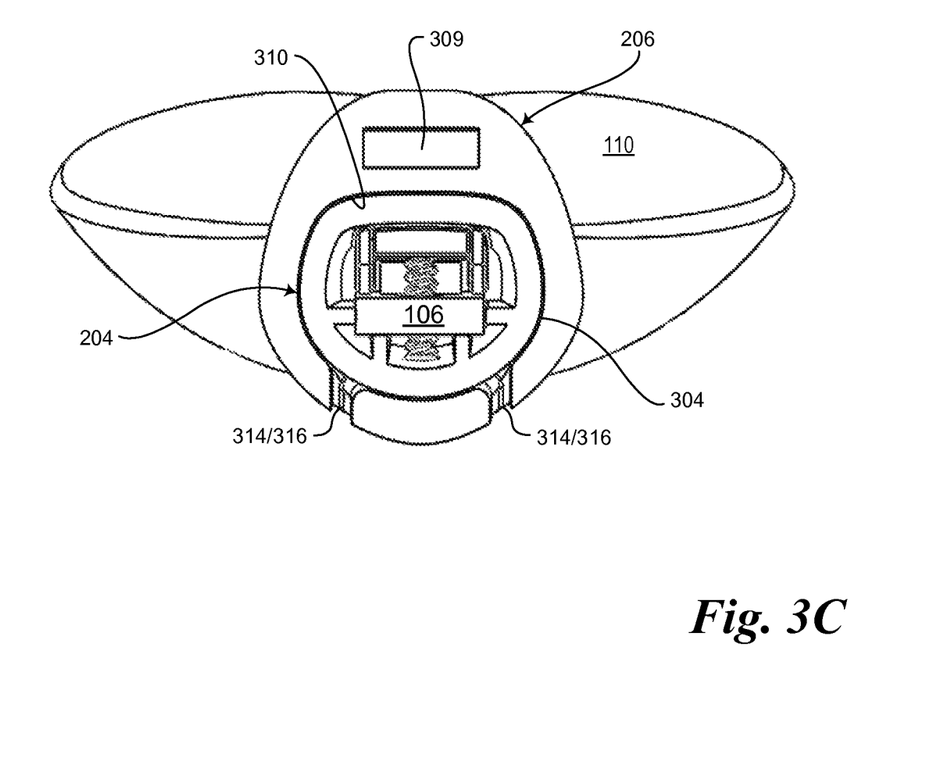
FIG. 3C is a transverse cross-sectional drawing of the embodiment of an adapter shown in FIG. 3A showing an implement attached to the tremor cancellation platform using the embodiment of an adapter.

FIGS. 3A-3C illustrate details of an embodiment of adapter 202. FIG. 3A is a longitudinal (i.e., side) cross-section, while FIGS. 3B-3C are transverse cross sections. FIG. 3A illustrates the details of first adapter section 204 and second adapter section 206. In the illustrated embodiment first adapter section 204 is a tapered key having a hollow interior to receive attachment arm 106. Tapered key 204 is attached to attachment arm 106 by screw 302. First adapter section 204 has a base with transverse dimension w2 positioned closest to tremor cancellation platform 102 and has a tip of transverse dimension w1 positioned furthest from platform 102. Tapered key 204 is tapered so that its tip is narrower than its base—that is, it has a taper ratio w1/w2 less than 1. In different embodiments taper ratio w1/w2 can be between zero (i.e., a sharp tip) and just under 1.

Outer surface 304 of tapered key 204 includes a slot 305 at or near its tip to receive a corresponding element 305b from second adapter section 206. Outer surface 304 also includes one or more slots, notches, or both 306 to receive a latch 314/316 from the second adapter section, thereby keeping the second adapter section firmly attached to the first. Also positioned inside tapered key 204 is a contactless switch 307, as well as associated circuitry that can be on a circuit board in the hollow interior of the tapered key.

Second adapter section 206 includes an open-ended cavity 308 sized and shaped to receive first adapter section 204. Cavity 308 is also tapered, with transverse dimension w2 at its open end and transverse dimension w1 at its closed end, so that it has substantially the same taper ratio as tapered key 204. Outer surface 304 of tapered key 204 corresponds substantially in size and shape to inner surface 310 of open-ended cavity 308 so that, when tapered key 204 is inserted into cavity 308 outer surface 304 is substantially in contact with inner surface 310. This results in a tight waterproof fit.

At least one compliant latch 314 can be positioned inside cavity 308 to engage tapered key 204, and can includes a tab 316 that will engage detent or slot 306 in tapered key 204 to keep the second adapter section firmly attached to the first adapter section. Once the second adapter section 206 is fitted to tapered key 204, it is pressed toward tremor cancellation platform 102 until the compliant latch locks the implement to the tremor cancellation platform. This latch can be used to produce sufficient friction to prevent unintentional separation of the attachment from the attachment arm. A compliant latch can also be fabricated in the second adapter section so that a tab 316 can lock into a detent or slot 306 in outer surface 304 of the tapered key. Compliant latch 314 and tab 316 be constructed from the plastic itself. In other embodiments a ball detent mechanism or some other mechanism can be used instead of, or in addition to, compliant latch 314 and tab 316.

Second adapter section 206 can also include a permanently embedded magnet 309. When tapered key 204 is fully inserted into second adapter section 206, embedded magnet 309 comes close enough to contactless switch 307 to activate it (i.e., close it), thus automatically activating tremor cancellation platform 102. This allows a user with tremors to avoid the extra step of manually activating a switch. In the illustrated embodiment a contactless Reed switch is used in tapered key 204 to sense when embedded magnet 309 comes near and to then activate power to the tremor cancellation platform. Magnet activates 309 activates the contactless switch only when the second adapter section 206 is fully secured on tapered key 204. Other magnetic sensing devices can be employed in the place of the Reed switch including, for instance, Hall-effect sensors.

FIG. 3B illustrates the cross-sectional shape of tapered key 204. The cross-sectional shape of the tapered key is a non-circular, non-symmetric shape that can constrain rotation of the attachment relative to the attachment arm. This cross-sectional shape also allows second adapter section 206 to fit on tapered key 204 in only one orientation, so that implement 110 can only be attached in the correct orientation—in the illustrated embodiment, the spoon can only connect to tremor cancellation platform 102 with the bowl of the spoon facing up. Visual markings can also be placed on the surface 304 of the tapered key and on the outside of second adapter section 206 to assist the user in attaching the implement in the correct orientation.

Outer surface 304 of tapered key 204 has two parts: a substantially flat part 320 and a curved part 322 that merges smoothly with substantially flat part 320. The cross-sectional shape of tapered key 214 is non-circular and non-symmetric, meaning that it has no more than one plane of symmetry: in the illustrated embodiment, for instance, the cross-section of outer surface 304 is symmetrical about line 326, but not symmetric about line 324. This is referred to is a keyed cross-section, hence the description of first adapter section 204 as a tapered key. The keyed cross-section ensures that first adapter section 204 can only be inserted into cavity 308 in one orientation; that way implement 110 can only be installed on tremor cancellation platform 102 in the correct orientation. In other embodiments, first adapter section 204 can of course have different cross-sectional shapes than shown. In other embodiments, for instance, the cross-sectional shape of first adapter section 204, and the corresponding interior shape of open ended cavity 308, can be designed to automatically rotate second adapter section 206 to the correct orientation no matter what the orientation is when insertion of first adapter section 204 into cavity 308 begins.

FIG. 3C illustrates a cross-section of first adapter section 204 inserted into second adapter section 206. First adapter section 204 is positioned within cavity 308 and substantially fills it, so that all of outer surface 304 of first adapter section 204 is substantially in contact with inner surface 310 of cavity 308. This ensures a tight and somewhat waterproof substantially waterproof fit. At least one conforming latch 314 and tab 316 engage a corresponding notch or detent 306 in outer surface 304 to keep the first adapter section securely fastened to the second.

Figure 4:
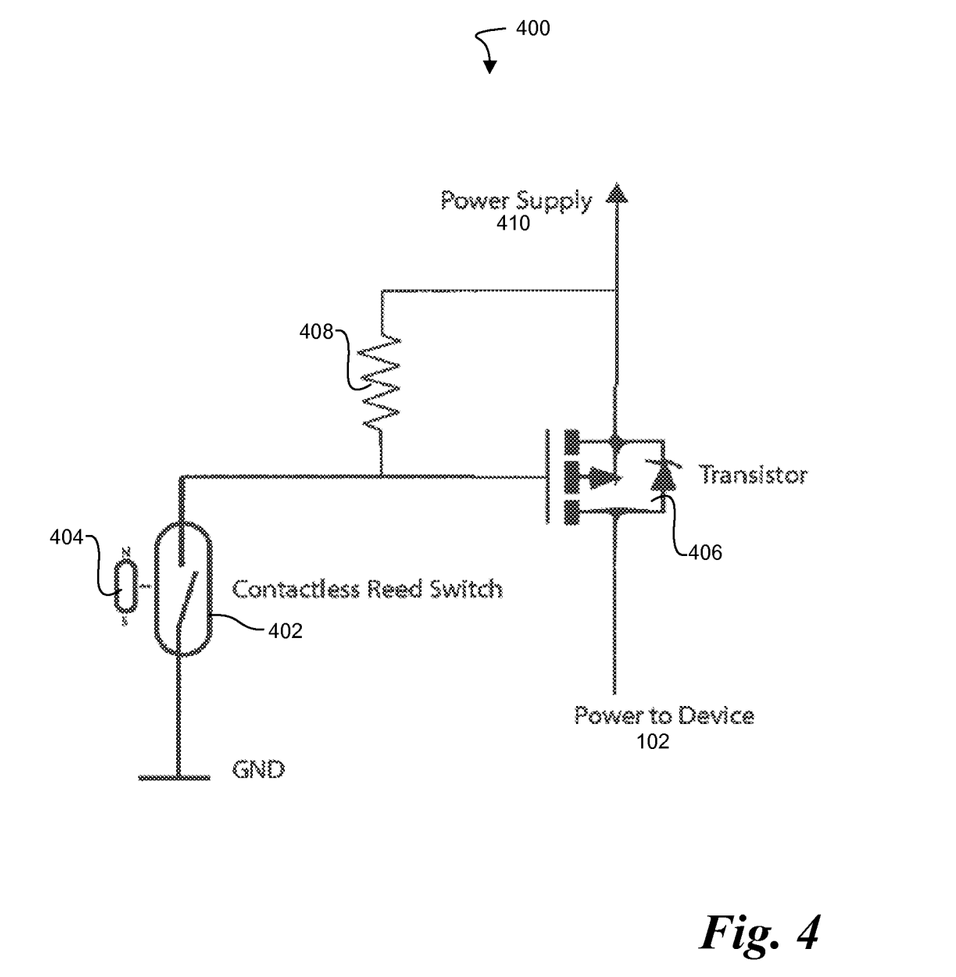
FIG. 4 is a circuit diagram of an embodiment of a contactless switch that can be used in an embodiment of the adapter.

FIG. 4 illustrates an embodiment of a contactless switch circuit 400 that can be used with embodiments of adapter 202 for automatic activation of the tremor cancellation platform. Circuit 400 includes a contactless switch 402. In the illustrated embodiment contactless switch 402 is a reed switch, but in other embodiments it can be another type of contactless switch, for instance a Hall Effect switch. Switch 402 is electrically coupled to power supply 410 and platform 102 via resistor 408 and transistor 406 as shown. In the illustrated embodiment transistor 406 is a high-side transistor (such as a MOSFET), but a low-side transistor can be employed with equal efficacy in other embodiments. When magnet 404 is brought near contactless switch 402 it activates the switch. Once the contactless switch is closed by a nearby magnetic field transistor 406 is activated, allowing current to flow from power supply 410 into tremor cancellation platform 102. If no magnetic field is present the transistor allows no current to flow, thus saving power when the device is not being used. The circuit provided is thus one example of a power-conserving strategy, but in other embodiments other configurations that allow power-saving can be used.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which must be construed using established doctrines of claim interpretation.

The invention claimed is:

1. An adapter for coupling an implement to a tremor cancellation platform, the adapter comprising:
    a first section attached to the tremor cancellation platform, the first section comprising an elongated tapered key having a base and a tip, the base having a first transverse dimension that is greater than a second transverse dimension at the tip and the base being attached to the tremor cancellation platform;
    a second section coupled to the implement, the second section including a tapered cavity sized and shaped to receive the first section, wherein the first section has an outer surface that smoothly transitions from the first transverse dimension at the base to the second transverse dimension at the tip over an entire length of the outer surface that mates with an inner surface of the tapered cavity, wherein the first section includes a cross-sectional shape having a flat portion and a curved portion wherein the cross-sectional shape of the elongated tapered key is non-symmetric about at least one axis to prevent the implement from being attached to the tremor cancellation platform in a wrong orientation; and
    a latch to lock the second section onto the first section, wherein the elongated tapered key of the first section includes:
        a first slot at the tip in the flat portion that mates with a corresponding element in the tapered cavity; and
        a second slot, notch, or detent at the base in the curved portion to engage the latch when the elongated tapered key is inserted into the tapered cavity, wherein the curved portion of the cross-sectional shape extends along the elongated tapered key.

2. The adapter of claim 1 wherein the flat portion and the curved portion of the cross-sectional shape both extend along the entire length of the elongated tapered key from the base to the tip.

3. The adapter of claim 1, further comprising a contactless switch positioned in the first section to automatically activate the tremor cancellation platform when the first section is inserted in the second section.

4. The adapter of claim 3 wherein the contactless switch is magnetically activated and wherein the second section includes an embedded magnet positioned to activate the contactless switch when the first section is inserted in the second section.

5. The adapter of claim 1 wherein the latch comprises a spring-loaded mechanism that engages the second slot, notch, or detent.

6. The adapter of claim 1 wherein the latch comprises a spring-loaded tab disposed in or on the tapered cavity of the second section that engages the second slot, notch, or detent.

7. The adapter of claim 1, wherein the outer surface of the first section forms a waterproof fit with the inner surface of the second section when the first section is mated to the second section.

8. The adapter of claim 1, wherein the first slot is disposed on an opposite side of the cross-sectional shape as the second slot, notch, or detent.

9. The adapter of claim 1, wherein the first slot extends to a distal end of the tip of the elongated tapered key.

10. A tremor cancellation system comprising:
    a tremor cancellation platform including a first adapter section, the first adapter section comprising an elongated tapered key having a base and a tip, the base having a first transverse dimension that is greater than a second transverse dimension at the tip and the base being attached to the tremor cancellation platform; and
    an implement including a second adapter section, the second adapter section including a tapered cavity sized and shaped to receive the first adapter section, wherein the first adapter section has an outer surface with a cross-sectional shape that smoothly transitions from the first transverse dimension at the base to the second transverse dimension at the tip over an entire length of the outer surface that mates with an inner surface of the tapered cavity, and wherein the second adapter section further includes a latch to lock the second adapter section onto the first adapter section so that the implement can be securely attached to the tremor cancellation platform, wherein the cross-sectional shape includes a flat portion and a curved portion, wherein the cross-sectional shape of the elongated key is non-symmetric about at least one axis to prevent the implement from being attached to the tremor cancellation platform in a wrong orientation,
    wherein the elongated tapered key includes:
        a first slot at the tip in the flat portion that mates with a corresponding element in the tapered cavity; and
        a second slot, notch, or detent at the base in the curved portion to engage the latch when the elongated tapered key is inserted into the tapered cavity, wherein the curved portion of the cross-sectional shape extends along the elongated tapered key.

11. The system of claim 10 wherein the flat portion and the curved portion of the cross-sectional shape both extend along the entire length of the elongated tapered key from the base to the tip.

12. The system of claim 10, further comprising a contactless switch positioned in the first adapter section to automatically activate the tremor cancellation platform when the first adapter section is inserted in the second adapter section.

13. The system of claim 12 wherein the contactless switch is magnetically activated and wherein the second section includes an embedded magnet positioned to activate the contactless switch when the first section is inserted in the second section.

14. The system of claim 10 wherein the latch comprises a spring-loaded tab in the tapered cavity of the second adapter section that engages the second slot, notch, or detent.

15. A tremor cancellation system comprising:
    a tremor cancellation platform;
    a first adapter section coupled to the tremor cancellation platform, the first adapter section comprising an elongated tapered key having a base and a tip, the base having a first transverse dimension that is greater than a second transverse dimension at the tip and the base being attached to the tremor cancellation platform, wherein the first adapter section has an outer surface that smoothly transitions from the first transverse dimension at the base to the second transverse dimension at the tip over an entire length of the outer surface shaped for mating with a second adapter section, wherein the first adapter section includes a cross-sectional shape having a flat portion and a curved portion, wherein the cross-sectional shape of the elongated tapered key is non-symmetric about at least one axis to prevent the second adapter section from being attached to the first adapter section in a wrong orientation, wherein the elongated tapered key includes:
- a first slot at the tip in the flat portion that mates with a corresponding element in the second adapter section; and
- a second slot, notch, or detent at the base in the curved portion to engage a latch of the second adapter section when the elongated tapered key is inserted into the second adapter section, wherein the curved portion of the cross-sectional shape extends along the elongated tapered key.

16. The system of claim 15, further comprising:
a user implement;
the second adapter section coupled to the user implement, the second adapter section including a tapered cavity sized and shaped to receive the first adapter section.

17. The system of claim 16, further comprising a contactless switch positioned in the first adapter section to automatically activate the tremor cancellation platform when the first adapter section is inserted in the second adapter section.

18. The system of claim 17 wherein the contactless switch is magnetically activated and wherein the second section includes an embedded magnet positioned to activate the contactless switch when the first section is inserted in the second section.

* * * * *